April 19, 1960 J. L. GILLSON, JR 2,933,602
APPARATUS FOR GENERATING VISIBLE LIGHT
BY PHOTO-ELECTROLUMINESCENCE
Filed Oct. 10, 1955
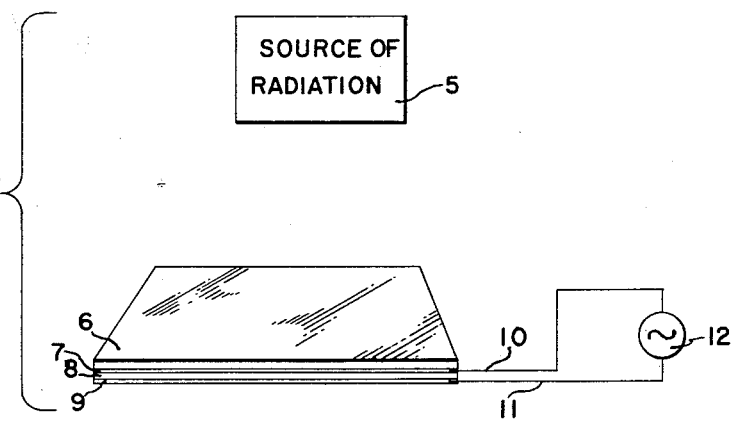
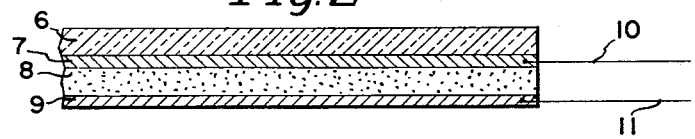
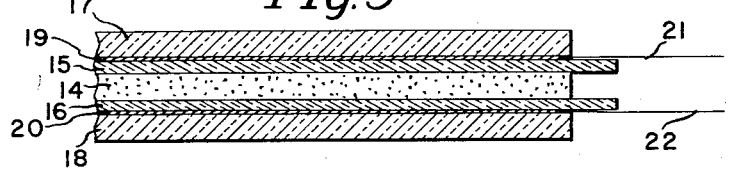
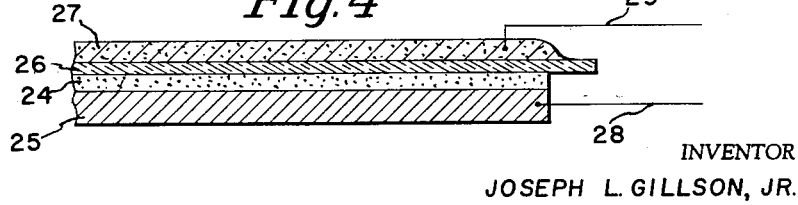
INVENTOR
JOSEPH L. GILLSON, JR.
BY
ATTORNEY

United States Patent Office 2,933,602
Patented Apr. 19, 1960

2,933,602

APPARATUS FOR GENERATING VISIBLE LIGHT BY PHOTO-ELECTROLUMINESCENCE

Joseph L. Gillson, Jr., Wilmington, Del., assignor to E. I. du Pont de Nemours and Company, Wilmington, Del., a corporation of Delaware Application October 10, 1955, Serial No. 539,568

13 Claims. (Cl. 250—71)

This invention relates to photo-electroluminescence, and is more particularly concerned with a process for generating visible light by the simultaneous action of radiation and an electric field on manganese-activated zinc sulfides, and with apparatus utilizing this process.

This application is a continuation-in-part of U.S. application Serial No. 508,209, now abandoned, filed May 13, 1955.

The emission of visible light by certain materials when irradiated at room temperature is called photoluminescence; it involves the transformation into visible wave lengths of invisible light having shorter wave lengths, i.e., X-rays and ultraviolet rays. These invisible rays, which are electromagnetic radiations in the ultraviolet and X-ray regions, possess sufficient energy to cause effects attributable to electron rearrangement or excitation in molecules irradiated, one resulting phenomenon being the photoluminescent response of suitable materials. This property has found practical applications, but the brightness of visible light produced is limited and is undesirably feeble for many potential uses.

A different approach to the problem of generating visible light utilizes a fluctuating electric field to produce electroluminescence. An article by Payne, Mager and Jerome, Illuminating Engineering November 1950, pages 686–693, describes a luminous capacitor in which a suitable phosphor suspended in a solid dielectric is coated on the transparent, electrically conducting surface of a "conducting glass," and the coating is covered with a metallic film. A sine wave alternating voltage impressed across the conducting surface and the metallic film caused the phosphor to luminesce. Curves are reproduced showing that the brightness of electroluminescence increased rapidly with both magnitude and frequency of fluctuation of the voltage imposed. The phosphor used is not named. The glass was described by a representative of the manufacturer as having a fired-on electrically conducting surface coating of the order of 0.00002 inch thick, and as being quite transparent, hard, resistant to chemical attack, economically practical, and commercially available.

Irradiation of matter with electromagnetic radiation in the ultraviolet-X-ray range causes various phenomena, depending upon the material irradiated. In the case of cadmium sulfide crystals the effect is evidenced by a reduction in the electrical impedance. U.S. Patent No. 2,650,310, issued August 25, 1953, to William C. White, discloses a way of utilizing this property of cadmium sulfide crystals with an electroluminescent capacitor, of the type discussed above, so that production of visible light is controlled by X-rays. Glass is provided with a light-transparent electrically conducting film, such as tin oxide. A thin layer of electroluminescent phosphor, bonded by a resinous dielectric material is deposited on the conducting film. A suitable phosphor is said to be a fired mixture of about 60 parts zinc sulfide, 15 parts zinc selenide and about 0.5 part copper. A stratum of closely packed cadmium sulfide crystals is placed on the phosphor layer and covered with a thin sheet of aluminum. The assembly is completed with a sheet of rubber and a stiff backing sheet which is transparent to X-rays. Alternating current is applied across the aluminum sheet and the conducting film on the glass. When X-rays passing through the backing sheet, the rubber and the aluminum strike the cadmium sulfide crystals, the impedance of this material is lowered. This increases the intensity of the electric field in the phosphor layer, resulting in an electroluminescent response of the type discussed in the article by Payne et al.

Payne et al. teach that the brightness of visible light emitted by the luminous capacitor depends exclusively on the ability of the phosphor to eleectroluminesce and the energy supplied by the applied field. The White patent shows how X-rays may be used to modify the electrical input, but the X-rays contribute nothing to the brightness obtained with a given input of electrical energy. Furthermore, the unbonded layer of cadmium sulfide crystals proposed by the patent would introduce difficulties in construction of an assembly which will give uniform light response in practical use. An apparatus having the simplicity of construction and operation disclosed by Payne et al., but which effectively utilizes the energy of both electromagnetic radiation and an electric field to produce visible light would be an important advance.

It is an object of this invention to provide an improved process and apparatus for generating visible light of increased brightness by phosphor luminescence. Other objects of the invention will be apparent from the specification, the drawings and the claims.

In accordance with this invention it has been found that manganese-activated zinc sulfide particles containing 0.005% to 0.5% by weight of manganese, or 0.005% to 0.5% of manganese and up to 0.03% of copper or iron, emit visible light when irradiated with electromagnetic radiations in the ultraviolet-X-ray range, and that the intensity of this visible light is increased astonishingly when the irradiated particles are simultaneously excited by a fluctuating electric field. The brightness is also increased surprisingly over that produced by electroluminescence alone. The manganese-activated zinc sulfide particles which are especially effective in this invention are those activated with manganese in combination with copper.

The apparatus of this invention is a simple and efficient visible light generator which comprises (a) fine particles of manganese-activated zinc sulfide dispersed in a light-transparent dielectric medium between two electrically conductive members arranged to form a capacitor, (b) electrical means to provide a fluctuating electric field between the conductive members to excite the zinc sulfide particles, and (c) means for irradiating the particles to produce a desired visible light response. One of the conductive members provided is transparent to electromagnetic radiations of the ultraviolet-X-ray range to permit irradiation of the zinc sulfide particles. One of the conductive members, which may be the same or distinct from the above transparent member, is transparent to the emitted visible light. With this assembly, more efficient use of the electric field results from close spacing of the conductive members, but the conductive members do not need to be in contact with the zinc sulfide particles.

The brightness of visible light emitted by this apparatus is many times greater when using both irradiation and the electric field than is obtained by photoluminescence alone without the electric field, or by electroluminescence alone without radiation.

The process of this invention is a method for generating visible light by subjecting a dispersion of a manganese-activated zinc sulfide phosphor in a dielectric medium sumultaneously to an electric field and to X-ray or ultraviolet light. The combined effects of the electric field and the irradiation have a remarkable synergistic effect on the total amount of visible light emitted by the phosphor.

In the accompanying drawings, which illustrate preferred embodiments of the invention, Figure 1 shows, in perspective, one type of apparatus used in carrying out the process of this invention, Figure 2 is a side view, in section, of the light-generating cell employed in Figure 1, and Figures 3 and 4 are side views, in section, of alternative cells in accordance with the present invention.

Referring to Figure 1, X-ray or ultraviolet radiation is supplied by a suitable source 5. The radiation passes through a transparent glass plate 6, having on its lower surface a transparent conductive layer 7, e.g., a layer of tin oxide, and strikes particles of manganese-activated zinc sulfide phosphor in layer 8. These particles are dispersed in a light-transparent dielectric medium, e.g., beeswax or a synthetic resin such as polymethyl methacrylate or polystyrene. The preparation of these phosphor particles is described subsequently; they have the property of emitting visible light when irradiated or excited by a fluctuating electrical field. The bottom layer 9 of the cell is a conductive metal plate or foil. This metal plate or foil and the conductive layer 7 of the upper glass plate are connected by suitable electrical leads, 10 and 11, to a source of alternating voltage, such as an alternating voltage generator 12, having a voltage and frequency capable of feebly exciting the phosphor particles in the layer 8 in the absence of irradiation. When the resulting electrical field is impressed across the irradiated phosphor layer, the visible light emitted from the phosphor is greatly intensified in brightness in contrast to that produced by irradiation in the absence of the electric field excitation.

Details of construction of the light generating cell used in Fig. 1 are shown in Fig. 2, which is a side view of the cell, in section. In this figure, the top layer 6 is a glass plate having on its lower surface a transparent conductive layer 7, e.g., a layer of tin oxide. The conductive layer 7 is in close contact with light-generating layer 8, comprising a dispersion of manganese-activated zinc sulfide phosphor particles in a light-transparent dielectric medium. The bottom of the light-generating layer is in close contact with a metal layer 9, e.g., aluminum foil. The transparent layers, 6 and 7, transmit the radiation to the phosphor particles and, when an alternating voltage is applied through electrical leads 10 and 11 to the conductive layers, 7 and 9, respectively, the light emitted from the phosphor particles is greatly enhanced.

Fig. 3 illustrates another embodiment of light-generating cell. In this cell the dispersion of manganese activated zinc sulfide phosphor particles in dielectric medium 14 forms an interlayer between two sheets of mica, 15 and 16, and this is assembled between two electrically conducting transparent plates, 17 and 18, which are coextensive with the phosphor layer. The transparent conductive layers, 19 and 20, of the plates are connected by electrical leads, 21 and 22, to a source of alternating voltage. In this type of cell the light emitted by the phosphor layer is visible from either side of the cell.

Fig. 4 illustrates a still different embodiment of the light-generating cells of this invention. In this embodiment a thin layer 24 of manganese-activated zinc sulfide phosphor particles uniformly dispersed in a dielectric medium is placed on a metal plate 25. On the upper surface of the phosphor layer is placed a thin sheet 26 of transparent insulating material, e.g., a thin sheet of mica, and the top surface of this sheet is covered by a transparent conductive layer 27, a layer of an aqueous solution of a salt, e.g., sodium chloride, being shown. Electrical leads, 28 and 29, connect the two conductive layers, 25 and 27, respectively, to a source of alternating voltage having a frequency and voltage suitable for activating the phosphor particles in layer 24.

The phosphors operable in the visible light generator of this invention are manganese-activated zinc sulfide phosphors. Phosphors consisting of zinc sulfide particles prepared with from 0.005 to 0.5% of their weight of manganese and with 0% to 0.03% of their weight of copper or iron, and fired at 950° to 1200° C. for periods ranging from 5 hours at the lower temperature to 1¼ hours at the higher temperature are suitable for use in the process of this invention. The phosphor, in the form of a microcrystalline powder, is readily mixed with a dielectric material; the resulting dispersion is then used to form a coating, film or sheet.

The dielectric medium in which the zinc sulfide phosphor particles are dispersed can be any of a wide variety of light-transmitting dielectric materials. In addition to the beeswax, polystyrene and polymethyl methacrylate mentioned previously, other polymeric dielectric materials can be used, e.g., ethylcellulose, nitrocellulose, plasticized polyvinyl chloride, and the like. A liquid dielectric material can be used if suitable means are employed to retain the dispersion of phosphor in the liquid dielectric between the conducting layers of the cell.

The light-generating cells of the drawings have been described with particular reference to the use of glass coated with a layer of transparent tin oxide as a transparent conductive layer. However, the cells of this invention can be made of other transparent materials and other conductive layers. Transparent sheets can be coated with various transparent conducting materials, and can be composed of polymers such as ethylcellulose, nitrocellulose, polyvinyl chloride, and the like.

Opaque conductive layers of the light generators of this invention can be any metal in the form of foil, evaporated film, plates, or thick sheets. These conductive layers should be arranged so that their surfaces are close to the surfaces of the phosphor-dielectric dispersion in order that an adequate electric field can be impressed on the phosphor particles with moderate applied voltages. Best results are obtained when the conductive layers are arranged in direct contact with the phosphor dispersion layer, but this is not essential for satisfactory results.

Ultraviolet light having a wave length in the range of 2,000 to 3,900 A., and X-rays having a wave length in the range of 0.1 to 3 A. are particularly well suited for use with the manganese-activated zinc sulfide phosphors employed in the light generators of this invention.

As indicated above, a wide range of electric field conditions can be used to provide the electric excitation in the process of this invention. Alternating electric fields in the phosphor-dielectric layer of 10 to 800 R.M.S. (root mean square) volts per mil and 25 to 500,000 cycles per second are suitable. The exact voltage and frequency used in any particular case depends on the particular construction of the light-generating cell being used, i.e., on the density of the phosphor particles, the thickness of the phosphor-dielectric layer, etc. In general, the brightness of luminescence in the phosphor layer increases with an increase in the magnitude of the applied electric field.

The following examples illustrate the unexpected increase in the intensity of light emitted by the phosphor in the light-generating cell of this invention when employing both ultraviolet radiation and electric field excitation at the same time:

*Example 1*

A light-generating cell of the type shown in Fig. 4 is made up by placing on the upper surface of a horizontal brass plate a layer, about one mil (0.001 inch) in thickness, of a dispersion of approximately 3 parts by weight of manganese-activated zinc sulfide phosphor particles (0.2% manganese, fired at 1200° C. for 1.25 hours) in 1 part of beeswax. A sheet of mica about one mil thick is placed on top of the phosphor-beeswax layer and, finally, a layer of aqueous sodium chloride solution is spread on top of the mica sheet coextensive with the phosphor layer underneath the mica. The brass plate and the salt solution are connected by electrical leads to an audio oscillator as the source of alternating voltage. Ultraviolet radiation is directed on the phosphor layer, using an A–H3 mercury arc lamp as the source of ultraviolet light. This particular lamp emits a large proportion of light having a wave length of 3650 A. The intensity of the visible light emitted from the phosphor layer is measured by a photometer provided with filters to filter out scattered ultraviolet light radiation. The amount of light emitted under the ultraviolet excitation is measured in arbitrary units. The ultraviolet light is then turned off and an electric field is impressed on the phosphor layer. The strength of the field is adjusted until the light emitted by the phosphor layer is of the same intensity as that emitted under ultraviolet excitation. An electric field of about 800 R.M.S. volts per mil in the phosphor layer is produced by impressing 1500 R.M.S. volts at 1000 cycles per second across the entire cell. This is found to give the same intensity of light emission as irradiation by ultraviolet light. The phosphor layer is then exposed to the light from the ultraviolet lamp while 1500 R.M.S. volts at 1000 cycles per second is applied to the conducting layers. The intensities of visible light emitted under these conditions are compared below.

| Method of Excitation | Relative Intensities of Visible Light |
| --- | --- |
| Ultraviolet light alone | 1.0 |
| Electric field alone | 1.0 |
| Ultraviolet + electric field | 7.5 |

*Examples 2–6*

Light generating cells similar to that shown in Fig. 3 are made up by placing on the conducting surface of a horizontal conducting glass plate a sheet of mica about one mil thick and on top of the mica layer, about one mill thick, of a dispersion in 1 part of beeswax of approximately 3 parts by weight of a zinc sulfide phosphor activated with 0.2% of manganese in combination with 0.0025% or 0.01% of copper or 0.01% of iron as indicated in the table below. Another sheet of mica about one mil thick is placed on top of the phosphor-beeswax layer and aqueous sodium chloride solution is spread on top of the mica to form a layer coextensive with the phosphor layer underneath the mica. The resulting cell is irradiated with ultraviolet light of wave length 3650 A. by means of a mercury arc lamp of the type described in Example 1. The intensity of the visible light emitted from the phosphor layer is measured by a photometer as described in Example 1. The amount of light emitted under the ultraviolet excitation is measured in arbitrary units. The ultraviolet light is then turned off and a voltage of 2500 R.M.S. volts at the frequencies specified in the table (10,000 cycles per second and 60 cycles per second) is impressed on the cell. This voltage produces an average field in the phosphor layer of approximately 658 R.M.S. volts per mil. The intensities of the light emitted in response to the electric field alone, and in response to simultaneous excitation by the electric field and by ultraviolet light, are measured in the same way as for ultraviolet light alone. The intensities of visible light emitted under these various conditions are tabulated in the following table. In this table under the column headed Electric field alone, the value <1 means that the amount of light emitted was detectable by the eye but was not sufficient to give a reading on the photometer used.

| Example | ZnS Activated with 0.2% Mn plus— | Frequency of Applied Field in Cycles/Sec. | Relative Intensities of Visible Light Emitted | | |
| --- | --- | --- | --- | --- | --- |
| | | | Ultraviolet Alone | Elec. Field Alone | Ultraviolet + Elec. Field |
| 2 | 0.0025% Cu | 10,000 | 5 | <1 | 19 |
| 3 | 0.01% Cu | 10,000 | 6 | <1 | 20 |
| 4 | 0.01% Cu | 60 | 6 | <1 | 14 |
| 5 | 0.01% Fe | 10,000 | 0.8 | <1 | 9 |
| 6 | 0.01% Fe | 60 | 0.8 | <1 | 4 |

The following examples illustrate the similar unexpected increase in the intensity of light emitted by the phosphor in the light-generating cell of this invention when employing both X-ray radiation and electric field excitation at the same time.

*Example 7*

A light-generating cell similar to that shown in Fig. 4 is made by placing on the upper surface of a brass plate a sheet of mica about one mil thick, then a layer, about one mil thick, of a dispersion of approximately 3 parts by weight of manganese-activated zinc sulfide phosphor particles (0.2% manganese, fired at 950° C. for 5 hours) in 1 part of beeswax. Another sheet of mica, about 1 mil thick, is placed on top of the phosphor-beeswax layer and aqueous sodium chloride solution is spread on top of the mica to form a layer coextensive with the phosphor layer underneath the mica. The resulting cell is irradiated with tungsten L X-ray radiation having principal wave lengths of 1.09–1.67 A., and the intensity of visible light emitted is measured as in Example 1. The brass plate and salt solution are connected to an audio oscillator supplying 2500 R.M.S. volts at 7000 cycles per second to produce an electric field of about 660 R.M.S. volts per mil in the phosphor layer. The intensities of light emitted in response to the field alone, and in response to simultaneous excitation by the field and the X-rays, are measured in the same way as for X-rays alone. The intensities of visible light emitted under these conditions are compared below.

| Method of Excitation | Relative Intensities of Visible Light Emitted |
| --- | --- |
| Tungsten L X-rays alone | 5.7 |
| Electric field alone | 1.0 |
| X-rays + electric field | 25.7 |

*Example 8*

A light generating cell identical to that used in Example 7 is irradiated with X-rays and is excited by an electric field as in Example 7 with the following exceptions: X-rays having a wave length in the range 0.5 to 0.12 A. are used, and the electric field impressed on the cell is 2000 R.M.S. volts at 1000 cycles per second which produces an average field in the phosphor layer of approximately 525 R.M.S. volts per mil. The intensities of visible light emitted under these conditions are compared below:

| Method of Excitation | Relative Intensities of Visible Light Emitted |
| --- | --- |
| X-rays alone | 25 |
| Electric field alone | 1 |
| X-rays + electric field | 80 |

From the data of Examples 1 to 8 it is evident that the simultaneous application of radiation and electric field excitation to a manganese-activated zinc sulfide phosphor caused a many-fold increase in the intensity of visible light emitted by the light generator over the use of either form of excitation alone. This great increase in intensity of light is unexpected.

Similar synergistic effects on the intensities of light emitted by simultaneous use of light in the ultraviolet-X-ray range and an electric field are observed when the light-generating cell is made with different manganese-activated zinc sulfide phosphors. This remarkable increase in intensity of light emitted is observed with zinc sulfide phosphors in which the zinc sulfide is activated with 0.005% to 0.5% of manganese and up to 0.03% of copper or iron by weight by firing at temperatures of 950° to 1200° C. for periods ranging from 5 hours at the lower temperature to one and one-quarter hours at the higher temperature. The phosphors activated with both manganese and 0.0025–0.03% copper are preferred since they generate more light than phosphors activated with manganese alone. The above manganese-activated phosphors may be prepared by conventional procedures used for preparing other phosphors, as by mixing an aqueous solution of a manganese salt, or of salts of manganese and copper or iron, with zinc sulfide to form a paste, drying to form a powder, and firing. A water-soluble flux may be used to assist in firing and thereafter leached from the activated phosphor.

Since many different embodiments of the invention may be made without departing from the spirit and scope thereof, it is to be understood that the invention is not limited by the specific illustrations except to the extent defined in the following claims.

What is claimed is:

1. An apparatus for generating visible light which comprises a light-generating member containing particles of zinc sulfide activated with 0.005% to 0.5% of manganese and dispersed in a light-transparent dielectric medium, an electrically conductive light-transparent member adjacent to one face of said light-generating member, an electrically conductive member adjacent to the other face of said light-generating member, a source of electromagnetic radiation in the ultra-violet-X-ray range for directing radiation onto said light-generating member with resultant energizing of said particles to emit visible light, and electrical means for simultaneously impressing an electrical field between said conductive members to excite said particles, whereby the intensity of the emitted light is greatly increased.

2. An apparatus as defined in claim 1 in which said electromagnetic radiation is X-ray radiation.

3. An apparatus as defined in claim 1 in which said electromagnetic radiation is ultraviolet light.

4. An apparatus as defined in claim 1 in which said particles consist essentially of zinc sulfide actviated with 0.005% to 0.5% by weight of manganese.

5. An apparatus as defined in claim 1 in which said particles consist essentially of zinc sulfide activated with 0.005% to 0.5% of manganese and up to 0.03% of copper by weight.

6. An apparatus as defined in claim 1 in which said particles consist essentially of zinc sulfide activated with 0.005% to 0.5% of manganese and up to 0.03% of iron by weight.

7. An apparatus as defined in claim 1 in which one of said electrically conductive members is a transparent dielectric sheet having an electrically conductive coating of transparent tin oxide in direct contact with said light-generating member.

8. An apparatus as defined in claim 1 in which one of said electrically conductive members is a layer of metal arranged in direct contact with said light-generating member.

9. An apparatus as defined in claim 1 in which both of said electrically conductive members are light transparent.

10. An apparatus as defined in claim 1 in which said electrical means in a source of alternating voltage of 25 to 500,000 cycles per second and sufficient voltage to produce an electric field of 10 to 800 root mean square volts per mil in said light-generating member.

11. In an apparatus for generating visible light, a light-generating element comprising particles of manganese-activated zinc sulfide dispersed in a light-transparent dielectric medium between two electrically conductive members arranged to form a capacitor, said particles containing 0.005 to 0.5% by weight of manganese, and coacting means for electrically exciting and energizing said particles to generate visible light comprising electrical means connected across said conductive members for applying an alternating voltage of 25 to 500,000 cycles per second at an intensity producing a field of 10 to 800 root mean square volts per mil in said capacitor and means for directing energizing electromagnetic radiation onto said particles, at least one of said conductive members being transparent to said radiation and at least one of said conductive members being transparent to visible light.

12. An apparatus as defined in claim 11 in which said particles consist essentially of zinc sulfide activated with 0.0005% to 0.5% of manganese and up to 0.03% of copper by weight.

13. An apparatus as defined in claim 11 in which said particles consist essentially of zinc sulfide activated with 0.005% to 0.5% of manganese and up to 0.03% of iron by weight.

References Cited in the file of this patent

UNITED STATES PATENTS

| Number | Name | Date |
|---|---|---|
| 2,566,349 | Mager | Sept. 3, 1951 |
| 2,614,082 | Smith | Oct. 14, 1952 |
| 2,624,857 | Mager | Jan. 6, 1953 |
| 2,694,785 | Williams | Nov. 16, 1954 |
| 2,698,915 | Piper | Jan. 4, 1955 |
| 2,721,808 | Roberts et al. | Oct. 25, 1955 |
| 2,721,950 | Piper et al. | Oct. 25, 1955 |
| 2,774,902 | Burns | Dec. 18, 1956 |
| 2,780,731 | Miller | Feb. 5, 1957 |

OTHER REFERENCES

"Electroluminescence and Related Topics" by Destriau et al., from Proceedings of the I.R.E., vol. 43, No. 12, December 1955, pages 1911 to 1940

UNITED STATES PATENT OFFICE

CERTIFICATE OF CORRECTION

Patent No. 2,933,602                          April 19, 1960

Joseph L. Gillson, Jr.

It is hereby certified that error appears in the printed specification of the above numbered patent requiring correction and that the said Letters Patent should read as corrected below.

Column 2, line 14, for "eleectroluminesce" read -- electroluminesce --; column 3, line 2, for "sumultaneously" read -- simultaneously --; column 8, line 17, for "in a" read -- is a --.

Signed and sealed this 1st day of November 1960.

(SEAL)

Attest:

KARL H. AXLINE
Attesting Officer

ROBERT C. WATSON
Commissioner of Patents